United States Patent
Zhang et al.

(10) Patent No.: US 8,160,018 B2
(45) Date of Patent: Apr. 17, 2012

(54) METHODS OF UPLINK CHANNELIZATION IN LTE

(75) Inventors: Jianzhong Zhang, Irving, TX (US); Joonyoung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 645 days.

(21) Appl. No.: 12/289,978

(22) Filed: Nov. 7, 2008

(65) Prior Publication Data

US 2009/0231993 A1 Sep. 17, 2009

Related U.S. Application Data

(60) Provisional application No. 61/064,611, filed on Mar. 14, 2008, provisional application No. 61/136,327, filed on Aug. 28, 2008.

(51) Int. Cl.
*H04W 4/00* (2009.01)

(52) U.S. Cl. ........ 370/330; 370/208; 370/281; 370/295; 370/310.2; 370/319; 370/328; 370/344; 370/349; 370/480; 455/59; 455/60; 455/112; 455/422.1

(58) Field of Classification Search .................. 370/208, 370/210, 281, 295, 310.2, 319, 328–339, 370/343, 344, 349; 455/59, 60, 260, 112, 455/422.1

See application file for complete search history.

(56) References Cited

U.S. PATENT DOCUMENTS

| | | | |
|---|---|---|---|
| 2008/0268860 A1* | 10/2008 | Lunttila et al. | 455/450 |
| 2008/0298488 A1* | 12/2008 | Shen et al. | 375/260 |
| 2008/0310540 A1* | 12/2008 | Tiirola et al. | 375/267 |
| 2009/0046691 A1* | 2/2009 | Karjalainen et al. | 370/342 |
| 2009/0103482 A1* | 4/2009 | Imamura et al. | 370/329 |
| 2009/0175159 A1* | 7/2009 | Bertrand et al. | 370/203 |
| 2009/0196229 A1* | 8/2009 | Shen et al. | 370/328 |
| 2009/0232067 A1* | 9/2009 | Pajukoski et al. | 370/329 |

OTHER PUBLICATIONS

R1-081155, "*CR to 3GPP spec 36.211, Version 8.1.0: Update of Uplink Reference-Signal Hopping, Downlink Reference Signals, Scrambling Sequences, DwPTS/UpPTS Lengths for TDD and Control Channel Processing*", RAN WG1 Meeting #52, Sorrento, Italy, Feb. 11-15, 2008.

R1-080983, "*Way-Forward on the Cyclic Shift Hopping for PUCCH*", Ran WG1 Meeting #52, Panasonic, Samsung, ETRI, Sorrento, Italy, Feb. 11-15, 2008.

R1-073564, "*Selection of Orthogonal Cover and Cyclic Shift for High Speed UL ACK Channels*", RAN WG1 Meeting #50, Samsung, Athens, Greece, Aug. 20-24, 2007.

R1-080707, "*Cell Specific CS Hopping and Slot Based CS/OC Remapping on PUCCH*", RAN WG1 Meeting #52, Texas Instruments, Sorrento, Italy, Feb. 11-15, 2008.

(Continued)

*Primary Examiner* — Hoon J Chung

(57) ABSTRACT

Methods of a slot-level remapping physical uplink control channels into two resource blocks respectively located at two slots of a subframe, are generally adapted to a 3GPP LTE physical uplink where ACK/NAK resource blocks may be applied by the extended cyclic prefix, adapted to a complex 3GPP LTE physical uplink where mixed resource blocks (where the ACK/NAK and CQI channels coexist) may be applied by the normal cyclic prefix, and adapted to a complex 3GPP LTE physical uplink where mixed resource blocks (where the ACK/NAK and CQI channels coexist) may be applied by the extended cyclic prefix.

27 Claims, 5 Drawing Sheets

OTHER PUBLICATIONS

3GPP TS 36.211 V8.3.0 (2008-05), "*3rd Generation Partnership Project; Technical Specification Group Radio Access Network; Evolved Universal Terrestrial Radio Access (E-UTRA); Physical Channels and Modulation*", published on Jun. 18, 2008.

3GPP TS 36.211 V8.4.0 (Sep. 2008), "*3rd Generation Partnership Project; Technical Specification Group Radio Access Network; Evolved Universal Terrestrial Radio Access (E-UTRA); Physical Channels and Modulation*", published on Sep. 24, 2008.

"ACK/NACK channelization for PRBs containing both ACK/NACK and CQI", Nokia Siemens Networks, Nokia, Texas Instruments, 3GPP TSG RAN WG1 Meeting #52, Sorrento, Italy, Feb. 11-15, 2008, 5 pages.

"Slot-based CS/OC re-mapping for PUCCH", Nokia Siemens Networks, Nokia, 3GPP TSG RAN WG1 Meeting #52, Sorrento, Italy, Feb. 11-15, 2008, 8 pages.

"Slot-level UL ACK/NACK Cyclic Shift/Orthogonal Cover Remapping", Samsung, 3GPP TSG RAN WG1 Meeting #51, Jeju, Korea, Nov. 5-9, 2007, 6 pages.

"Slot-level UL ACK/NACK Cyclic Shift/Orthogonal Cover Remapping", Samsung, 3GPP TSG RAN WG1 Meeting #50bis, Shanghai, China, Oct. 8-12, 2007, 6 pages.

"Slot-level UL ACK/NACK Cyclic Shift/Orthogonal Cover Remapping", Samsung, 3GPP TSG RAN WG1 Meeting #52, Sorrento, Italy, Feb. 11-15, 2008, 6 pages.

"Slot-based Cyclic Shift and Orthogonal Cover Re-mapping for UL ACK/NACK ", Huawei, 3GPP TSG-RAN WG1 Meeting #51bis, Sevilla, Spain, Jan. 14-18, 2008, 5 pages.

"On the Remaining Issues of PUCCH slot-based CS/OC remapping", ZTE, 3GPP TSG-RAN WG1 #53bis, Warsaw, Poland, Jun. 30-Jul. 4, 2008, 15 pages.

European Search Report dated Oct. 13, 2011 in connection with European Patent Application No. EP 09 15 5144.

* cited by examiner

US 8,160,018 B2

METHODS OF UPLINK CHANNELIZATION IN LTE

CLAIM OF PRIORITY

This application makes reference to, incorporates the same herein, and claims all benefits accruing under 35 U.S.C. §119 from an application earlier filed in the U.S. Patent & Trademark Office on 14 Mar. 2008 and there duly assigned Ser. No. 61/064,611, and an application earlier filed in the U.S. Patent & Trademark Office on 28 Aug. 2008 and there duly assigned Ser. No. 61/136,327.

BACKGROUND OF THE INVENTION

1. Field of the Invention

The present invention relates to a method and a apparatus for physical uplink transmission for 3GPP long term evolution (LTE), and more specifically, to a method and a apparatus generally adept at remapping physical uplink control channels for both of a resource block containing acknowledgement and non-acknowledgement (ACK/NAK) channel and a mixed resource block containing the ACK/NAK channels and channel quality indication (CQI) channels.

2. Description of the Related Art

Orthogonal Frequency Division Multiplexing (OFDM) is a popular wireless communication technology for multiplexing data in the frequency domain.

The total bandwidth in an Orthogonal frequency-division multiplexing (OFDM) system is divided into narrowband frequency units called subcarriers. The number of subcarriers is equal to the FFT/IFFT size N used in the system. Generally, the number of subcarriers used for data transmission is less than N because some of the subcarriers at the edge of the frequency spectrum are reserved as guard subcarriers, and generally no information is transmitted on these guard subcarriers.

The Third Generation Partnership Project Long Term evolution (3GPP LTE) is a project within the Third Generation Partnership Project to improve the Universal Mobile Telecommunications System mobile phone standard to cope with future requirements. In the standards of the physical uplink of 3GPP LTE (long term evolution), one type of the resources used for transmitting the uplink control channel (PUCCH) is known as a cyclic shift (CS) for each OFDM symbol. One of important aspects of the system design is resource remapping on either a symbol, slot or subframe-level.

The following three references are cited as being exemplary of contemporary practice in the art:

Reference [1], R1-081155, "CR to 3GPP spec 36.211 Version 8.1.0", RAN1#52, February 2008, Sorrento, Italy, describes the standards of the physical channels for 3GPP, and chapter 5.4.1 will be cited in the following specification in order to illustrate the slot-level remapping method for the acknowledgement and non-acknowledgement (ACK/NAK) channel in the physical uplink of 3GPP LTE system.

Reference [2], R1-080983, "Way-forward on Cyclic Shift Hopping Pattern for PUCCH", Panasonic, Samsung, ETRI, RAN1#52, February 2008, Sorrento, Italy, discloses methods for remapping either a resource block containing only ACK/NAK channel or a resource block containing both CQI and ACK/NAK channels.

Reference [3], R1-073564, "Selection of Orthogonal Cover and Cyclic Shift for High Speed UL ACK Channels", Samsung, RAN1#50, August 2007, Athens, Greece, teaches a scenario for data transmission for high speed uplink ACL/NAK channel by using a subset of the combination of the cyclic shift and the orthogonal cover.

Reference. [4], R1-080707, "Cell Specific CS Hopping and Slot Based CS/OC Remapping on PUCCH", Texas Instruments, Feb. 11-15, 2008, Sorrento, Italy, teaches cyclic shift (CS) hopping and slot based cyclic shift/orthogonal cover (CS/OC) remapping for PUCCH format 0 and 1, i.e. in the context of uplink ACK/NAK transmissions in correspondence to downlink packets.

The methods of the slot-level resource remapping recently proposed, for example as disclosed in references [2] and [3], have been included in the 3GPP standards as shown in reference [1]. One of the shortages of transmission capacity in wireless telecommunication networks is that the contemporary remapping methods for resource blocks containing control channels are designed exclusively for either ACK/NAK resource blocks with the extended cyclic prefix or for normal cyclic prefix cases where a mixed resource block containing both of the ACK/NAK and CQI channels, but contemporary remapping methods are not applicable for both. This shortage in transmission capacity prevents the contemporary techniques from being readily adapted to a complex 3GPP LTE physical uplink where ACK/NAK resource blocks may be applied by the extended cyclic prefix, adapted to a complex 3GPP LTE physical uplink where mixed resource blocks (where the ACK/NAK and CQI channels coexist) may be applied by the normal cyclic prefix, and adapted to a complex 3GPP LTE physical uplink where mixed resource blocks (where the ACK/NAK and CQI channels coexist) may be applied by the extended cyclic prefix.

SUMMARY OF THE INVENTION

It is therefore an object of the present invention to provide an improved method and an improved for conducting physical uplink transmission in order to overcome the above shortage which prevents the contemporary techniques from being generally adapted to a complex 3GPP LTE physical uplink.

It is another object of the present invention to provide a method and a circuit, with an intra-cell randomization, generally compatible with a complex 3GPP LTE physical uplink where ACK/NAK resource blocks may be applied by the extended cyclic prefix, or adapted to a complex 3GPP LTE physical uplink where mixed resource blocks (where the ACK/NAK and CQI channels coexist) may be applied by the normal cyclic prefix, or adapted to a complex 3GPP LTE physical uplink where mixed resource blocks (where the ACK/NAK and CQI channels coexist) may be applied by the extended cyclic prefix.

In the first embodiment of the present invention, a method for transmitting physical uplink channel signals, contemplates allocating a cyclic shift and an orthogonal cover to physical uplink control channels; and remapping the transmission resources in a slot-level in accordance with a selected remapping scheme, with:

when $n_s \bmod 2 = 0$, the remapped resource indices within a first slot in the two slots of a subframe to which the physical uplink channel symbols are mapped being established by:

$$n'(n_s) = \begin{cases} \text{if } n_{PUCCH}^{(1)} < c \cdot \dfrac{N_{cs}^{(1)}}{\Delta_{shift}^{PUCCH}}, \\ n_{PUCCH}^{(1)} \\ \text{otherwise,} \\ \left( n_{PUCCH}^{(1)} - c \cdot \dfrac{N_{cs}^{(1)}}{\Delta_{shift}^{PUCCH}} \right) \bmod \left( c \cdot \dfrac{N_{sc}^{RB}}{\Delta_{shift}^{PUCCH}} \right) \end{cases} \quad ; \text{ and}$$

when $n_s$ mod 2=1, the remapped resource indices within a second slot in the two slots of a subframe to which the physical uplink channel symbols are mapped being established by:

$$n'(n_s) = f(n'(n_s - 1)) = \begin{cases} \text{for normal cyclic prefix and } n_{PUCCH}^{(1)} \geq c \cdot \frac{N_{cs}^{(1)}}{\Delta_{shift}^{PUCCH}}, \\ [3(n'(n_s - 1) + 1)] \mod\left(\frac{3N_{sc}^{RB}}{\Delta_{shift}^{PUCCH}} + 1\right) - 1 \\ \text{otherwise}, \\ \left\{d + \left\lfloor\frac{n'(n_s - 1)}{c}\right\rfloor + [n'(n_s - 1) \bmod c] \cdot \left(\frac{N'}{\Delta_{shift}^{PUCCH}}\right)\right\} \bmod\left(\frac{cN'}{\Delta_{shift}^{PUCCH}}\right) \end{cases}$$

where:

$$d = \begin{cases} d_1 & \text{for normal cyclic prefix} \\ d_2 & \text{for extended cyclic prefix} \end{cases},$$

and $d_1$ and $d_2$ are a pair of two independent predetermined parameters,
$n_{PUCCH}^{(1)}$ is the resource index before remapping, $$c = \begin{cases} 3 & \text{for normal cyclic prefix} \\ 2 & \text{for extended cyclic prefix} \end{cases},$$

$$\Delta_{shift}^{PUCCH} \in \begin{cases} \{[1], 2, 3\} & \text{for normal cyclic prefix} \\ \{2, 3\} & \text{for extended cyclic prefix} \end{cases}, \text{ and}$$

$$\delta_{offset}^{PUCCH} \in \{0, 1, \ldots, \Delta_{shift}^{PUCCH} - 1\}$$

$N_{sc}^{RB}$ is the number of subcarriers in one resource block; and transmitting the physical uplink channel symbols by using the remapped transmission resources. Here, $d_1=2, d_2=0$, $d_1=2, d_2=2$, or $d_1=1, d_2=0$.

In the second embodiment of the present invention, a method for transmitting physical uplink channel signals, contemplates a method for transmitting physical uplink channel signals, contemplates allocating a cyclic shift and an orthogonal cover to physical uplink control channels; and remapping the transmission resources in a slot-level in accordance with a selected remapping scheme, with:

when $n_s$ mod 2=0, the remapped resource indices within a first slot in the two slots of a subframe to which the physical uplink channel symbols are mapped being established by:

$$n'(n_s) = \begin{cases} \text{if } n_{PUCCH}^{(1)} < c \cdot N_{cs}^{(1)}/\Delta_{shift}^{PUCCH}, \\ n_{PUCCH}^{(1)} \\ \text{otherwise}, \\ (n_{PUCCH}^{(1)} - c \cdot N_{cs}^{(1)}/\Delta_{shift}^{PUCCH}) \bmod(c \cdot N_{sc}^{RB}/\Delta_{shift}^{PUCCH}) \end{cases}; \text{ and}$$

when $n_s$ mod 2=1, the remapped resource indices within a second slot in the two slots of a subframe to which the physical uplink channel symbols are mapped being established by:

$$n'(n_s) =$$

$$f(n'(n_s - 1)) = \begin{cases} \text{for normal cyclic prefix and} \\ n_{PUCCH}^{(1)} \geq c \cdot N_{cs}^{(1)}/\Delta_{shift}^{PUCCH}, \\ [3(n'(n_s - 1) + 1)] \bmod(3N_{sc}^{RB}/\Delta_{shift}^{PUCCH} + 1) - 1 \\ \text{otherwise}, \\ \lfloor h(n'(n_s - 1))/c \rfloor + [h(n'(n_s - 1)) \bmod c] \cdot (N'/\Delta_{shift}^{PUCCH}) \end{cases}$$

where:

$$h(n'(n_s - 1)) = (n'(n_s - 1) + d) \bmod(cN'/\Delta_{shift}^{PUCCH}),$$

with $$d = \begin{cases} d_3 & \text{for normal cyclic prefix} \\ d_4 & \text{for extended cyclic prifix}, \end{cases}$$

and $d_3$ and $d_4$ are a pair of two independent predetermined parameters,
$n_{PUCCH}^{(1)}$ is the resource index before remapping, $$c = \begin{cases} 3 & \text{for normal cyclic prefix} \\ 2 & \text{for extended cyclic prefix}, \end{cases}$$

$$\Delta_{shift}^{PUCCH} \in \begin{cases} \{[1], 2, 3\} & \text{for normal cyclic prefix} \\ \{2, 3\} & \text{for extended cyclic prefix, and} \end{cases}$$

$$\delta_{offset}^{PUCCH} \in \{0, 1, \ldots, \Delta_{shift}^{PUCCH} - 1\}$$

$N_{sc}^{RB}$ is the number of subcarriers in one resource block; and transmitting the physical uplink channel symbols by using the remapped transmission resources. Here, $d_3=1, d_4=0$, or $d_3=1, d_4=1$.

In the third embodiment of the present invention, a method for transmitting physical uplink channel signals, contemplates a method for transmitting physical uplink channel signals, contemplates allocating a cyclic shift and an orthogonal cover to physical uplink control channels; and remapping the transmission resources in a slot-level in accordance with a selected remapping scheme, with:

when $n_s$ mod 2=0, the remapped resource indices within a first slot in the two slots of a subframe to which the physical uplink channel symbols are mapped being established by:

$$n'(n_s) = \begin{cases} \text{if } n_{PUCCH}^{(1)} < c \cdot N_{cs}^{(1)}/\Delta_{shift}^{PUCCH}, \\ n_{PUCCH}^{(1)} \\ \text{otherwise}, \\ (n_{PUCCH}^{(1)} - c \cdot N_{cs}^{(1)}/\Delta_{shift}^{PUCCH}) \bmod(c \cdot N_{sc}^{RB}/\Delta_{shift}^{PUCCH}) \end{cases}; \text{ and}$$

when $n_s$ mod 2=1, the remapped resource indices within a second slot in the two slots of a subframe to which the physical uplink channel symbols are mapped being established by:

$$n'(n_s) =$$

$$f(n'(n_s - 1)) = \begin{cases} \text{for normal cyclic prefix and} \\ n_{PUCCH}^{(1)} \geq c \cdot N_{cs}^{(1)}/\Delta_{shift}^{PUCCH}, \\ [3(n'(n_s - 1) + 1)] \bmod(3N_{sc}^{RB}/\Delta_{shift}^{PUCCH} + 1) - 1 \\ \text{otherwise}, \\ \{e + \lfloor h(n'(n_s - 1))/c \rfloor + \\ [h(n'(n_s - 1)) \bmod c] \cdot (N'/\Delta_{shift}^{PUCCH})\} \bmod(cN'/\Delta_{shift}^{PUCCH}) \end{cases}$$

where:

$$h(n'(n_s - 1)) = (n'(n_s - 1) + d) \bmod(cN'/\Delta_{shift}^{PUCCH}),$$

$$d = \begin{cases} d_3 & \text{for normal cyclic prefix} \\ d_4 & \text{for extended cyclic prifix}, \end{cases}$$

$$e = \begin{cases} e_3 & \text{for normal cyclic prefix} \\ e_4 & \text{for extended cyclic prefix}, \end{cases}$$

and $d_3$ and $d_4$ are a first pair of two independent predetermined parameters, and $e_3$ and $e_4$ are a second pair of two independent predetermined parameters, $n_{PUCCH}^{(1)}$ is the resource index before remapping, $$c = \begin{cases} 3 & \text{for normal cyclic prefix} \\ 2 & \text{for extended cyclic prefix,} \end{cases}$$

$$\Delta_{shift}^{PUCCH} \in \begin{cases} \{[1], 2, 3\} & \text{for normal cyclic prefix} \\ \{2, 3\} & \text{for extended cyclic prefix, and} \end{cases}$$

$$\delta_{offset}^{PUCCH} \in \{0, 1, \ldots, \Delta_{shift}^{PUCCH} - 1\}$$

$N_{sc}^{RB}$ is the number of subcarriers in one resource block; and transmitting the physical uplink channel symbols by using the remapped transmission resources. Here, $d_3=1, d_4=0$, $d_3=1$, $d_4=1$, $e_3=1, e_4=0$ or $e_3=2, e_4=2$.

In the fourth embodiment of the present invention, a method for transmitting physical uplink channel signals, the method comprising the steps of allocating a cyclic shift and an orthogonal cover to physical uplink control channels; remapping in a slot-level, the physical uplink control channels into two resource blocks respectively located at two slots of a subframe, with:

when $n_s \bmod 2=0$, resource indices of the physical uplink control channels within a first slot in the two slots of the subframe are established by:

$$n'(n_s) = \begin{cases} \text{if } n_{PUCCH}^{(1)} < c \cdot N_{cs}^{(1)} / \Delta_{shift}^{PUCCH}, \\ n_{PUCCH}^{(1)} \\ \text{otherwise,} \\ (n_{PUCCH}^{(1)} - c \cdot N_{cs}^{(1)} / \Delta_{shift}^{PUCCH}) \bmod (c \cdot N_{sc}^{RB} / \Delta_{shift}^{PUCCH}), \end{cases}$$

where $n_s$ is an index of slots within a subframe, $n_{PUCCH}^{(1)}$ is a resource index for physical uplink control channel format 1, 1a and 1b before remapping, $N_{cs}^{(1)}$ is the number of cyclic shifts used for the physical uplink control channel format 1, 1a and 1b in the resource block, $N_{sc}^{RB}$ is the size of resource block in the frequency domain; and when $n_s \bmod 2=1$, the resource indices of the physical uplink control channels within a second slot in the two slots of the subframe to which the physical uplink channel symbols are remapped by:

$$n'(n_s) = \begin{cases} n_{PUCCH}^{(1)} \geq c \cdot N_{cs}^{(1)} / \Delta_{shift}^{PUCCH}, \\ [c(n'(n_s - 1) + 1)] \bmod (cN_{sc}^{RB} / \Delta_{shift}^{PUCCH} + 1) - 1 \\ \text{otherwise,} \\ \lfloor h/c \rfloor + (h \bmod c) \cdot N' / \Delta_{shift}^{PUCCH} \end{cases}$$

where:

$h = (n'(n_s-1)+d) \bmod (cN'/\Delta_{shift}^{PUCCH})$, and $$d = \begin{cases} 2 & \text{for normal cyclic prefix} \\ 0 & \text{for extended cyclic prefix} \end{cases};$$

and transmitting the physical uplink channel symbols by using the remapped transmission resources.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
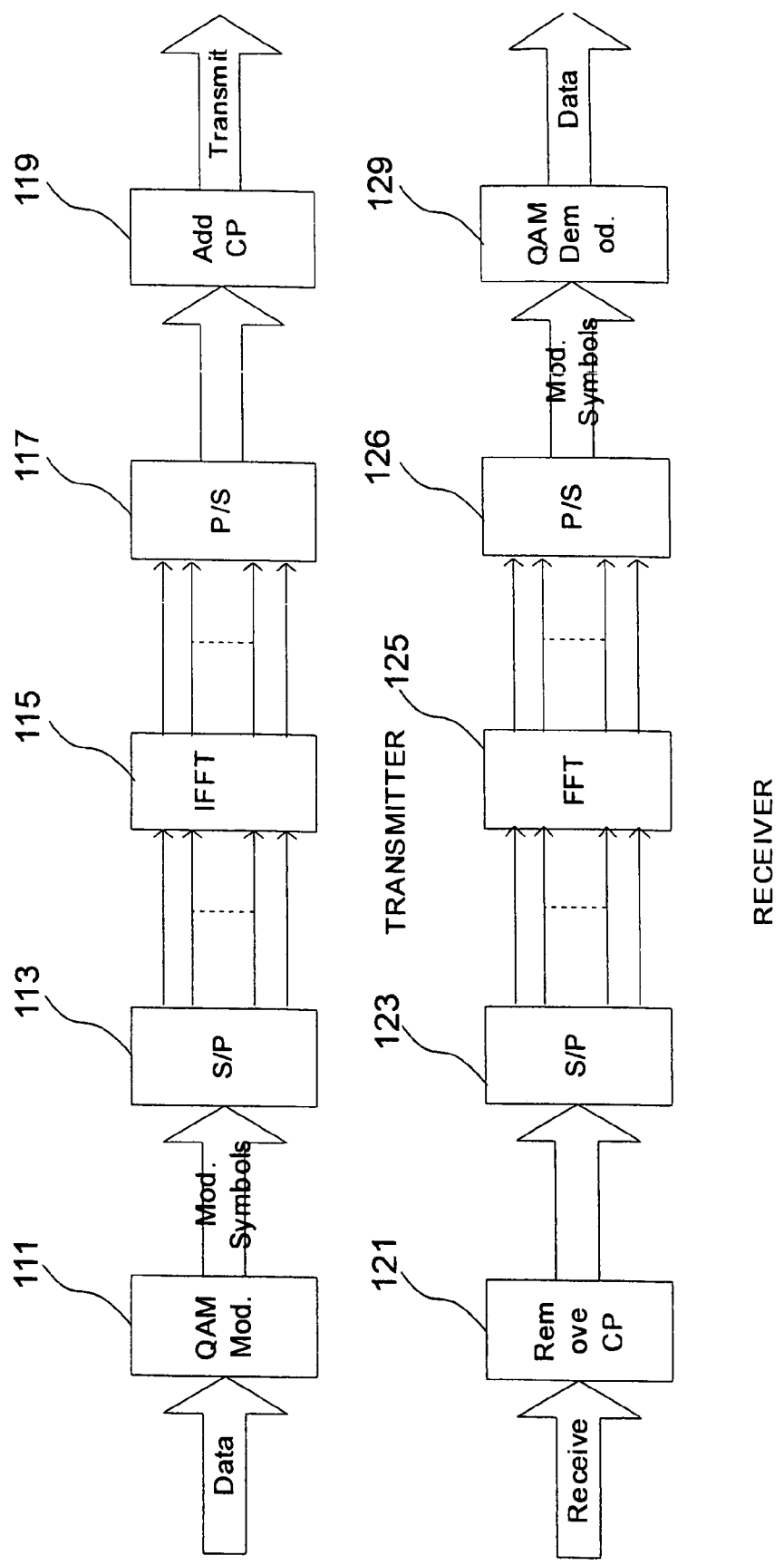
FIG. 1 is a block diagram of a simplified example of data transmission and reception using Orthogonal Frequency Division Multiplexing (OFDM)

A simplified example of data transmission/reception using Orthogonal Frequency Division Multiplexing (OFDM) is shown in FIG. 1.

At the transmitter, the input data to be transmitted is modulated by a quadrature amplitude modulation (QAM) modulator 111. The QAM modulation symbols are serial-to-parallel converted by a serial-to-parallel convertor 113 and input to an inverse fast Fourier transform (IFFT) unit 115. At the output of IFFT unit 115, N time-domain samples are obtained. Here N refers to the sampling number of IFFT/FFT used by the OFDM system. The signal transmitted from IFFT unit 115 is parallel-to-serial converted by a parallel-to-serial convertor 117 and a cyclic prefix (CP) 119 is added to the signal sequence. The resulting sequence of samples is referred to as the OFDM symbol. Serial to parallel convertor 113 uses shift registers to convert data from serial form to parallel form. Data is loaded into the shift registers in a serial load mode, and is then shifted parallel in a shift mode with a clock signal.

At the receiver, the cyclic prefix is firstly removed at cyclic prefix remover 121 and the signal is serial-to-parallel converted by serial-to-parallel convertor 123 before feeding the converted parallel signal into fast Fourier transform (FFT) transformer 125. Output of FFT transformer 125 is parallel-to-serial converted by parallel-to-serial convertor 128 and the resulting symbols are input to QAM demodulator 129. Parallel-to-serial convertor 128 uses shift registers to convert data from parallel form to serial form. Data is loaded into the shift registers in a parallel load mode, and is then shifted serially in a shift mode with a clock signal.

The total bandwidth in an OFDM system is divided into narrowband frequency units called subcarriers. The number of subcarriers is equal to the FFT/IFFT size N. In general, the number of subcarriers used for data is less than N because some of the subcarriers at the edge of the frequency spectrum are reserved as guard subcarriers, and no information is transmitted on guard subcarriers.

Figure 2:
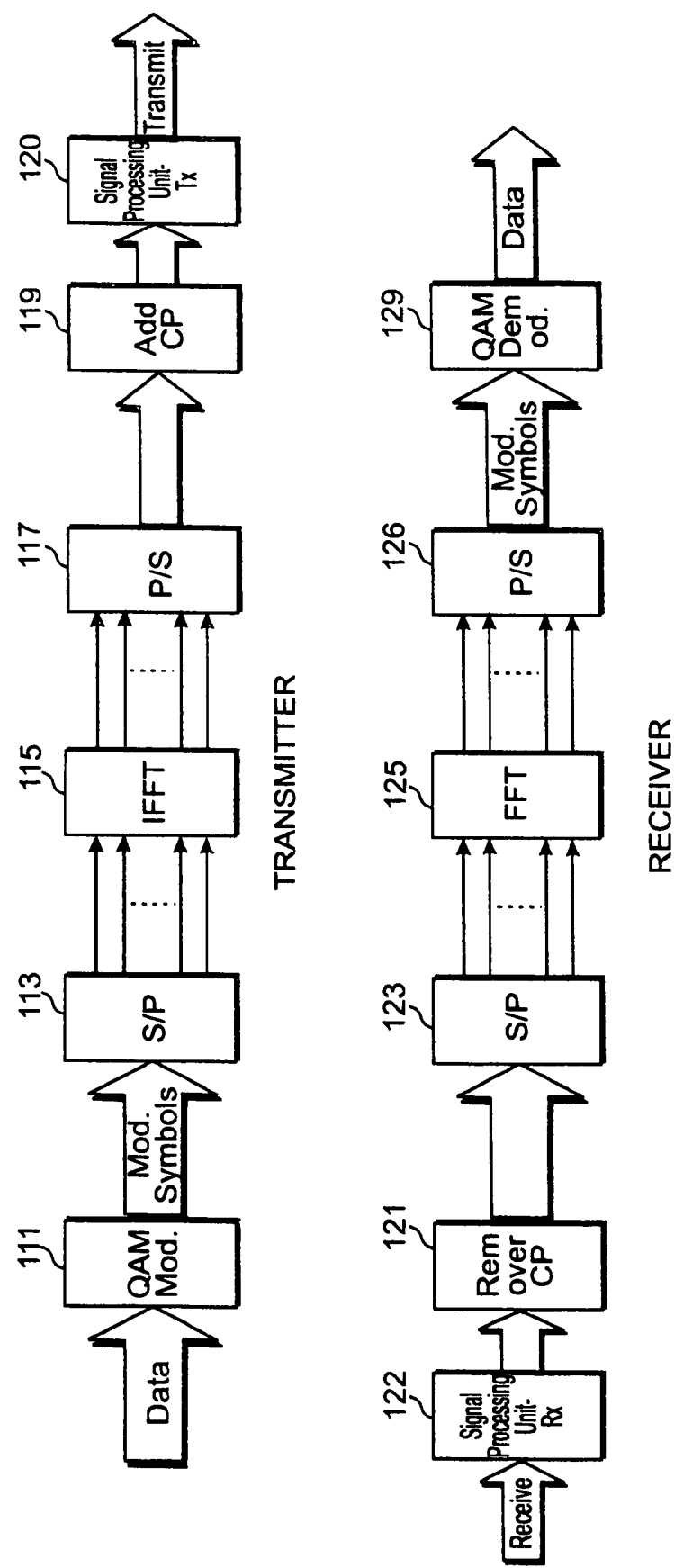
FIG. 2 is a block diagram of a simplified example of data transmission, data reception and signal processing stages using Orthogonal Frequency Division Multiplexing (OFDM)

FIG. 2 is a block diagram of a simplified example of data transmission, data reception and signal processing stages using Orthogonal Frequency Division Multiplexing (OFDM). As shown in FIG. 2, serial-to-parallel convertor 113 and IFFT unit 115 map the converted parallel signal into one resource block and transform a frequency domain representation of the converted parallel signal to a time domain representation. The OFDM symbols output from cyclic prefix (CP) 119 are further processed by signal processing unit_Tx 120 before being transmitted by the transmitting antennas. Similarly, the processed OFDM symbols transmitted from the transmitter are firstly processed by signal processing unit_Rx 122 before received by the receiving antennas. Signal processing unit_Tx 120 and signal processing unit_Rx 122 perform signal processing respectively for the transmitter and the receiver in accordance with certain signal processing schemes.

In the uplink of 3GPP LTE standards, one type of the resource used in the uplink control channel (PUCCH) is known as a cyclic shift (CS) for each OFDM symbol. PUCCHs are defined as channels carrying control signals in the uplink, and PUCCHs may carry control information, e.g., channel quality indication (CQI), ACK/NACK, hybrid automatic repeat requests (HARQ) and uplink scheduling requests.

Figure 3:
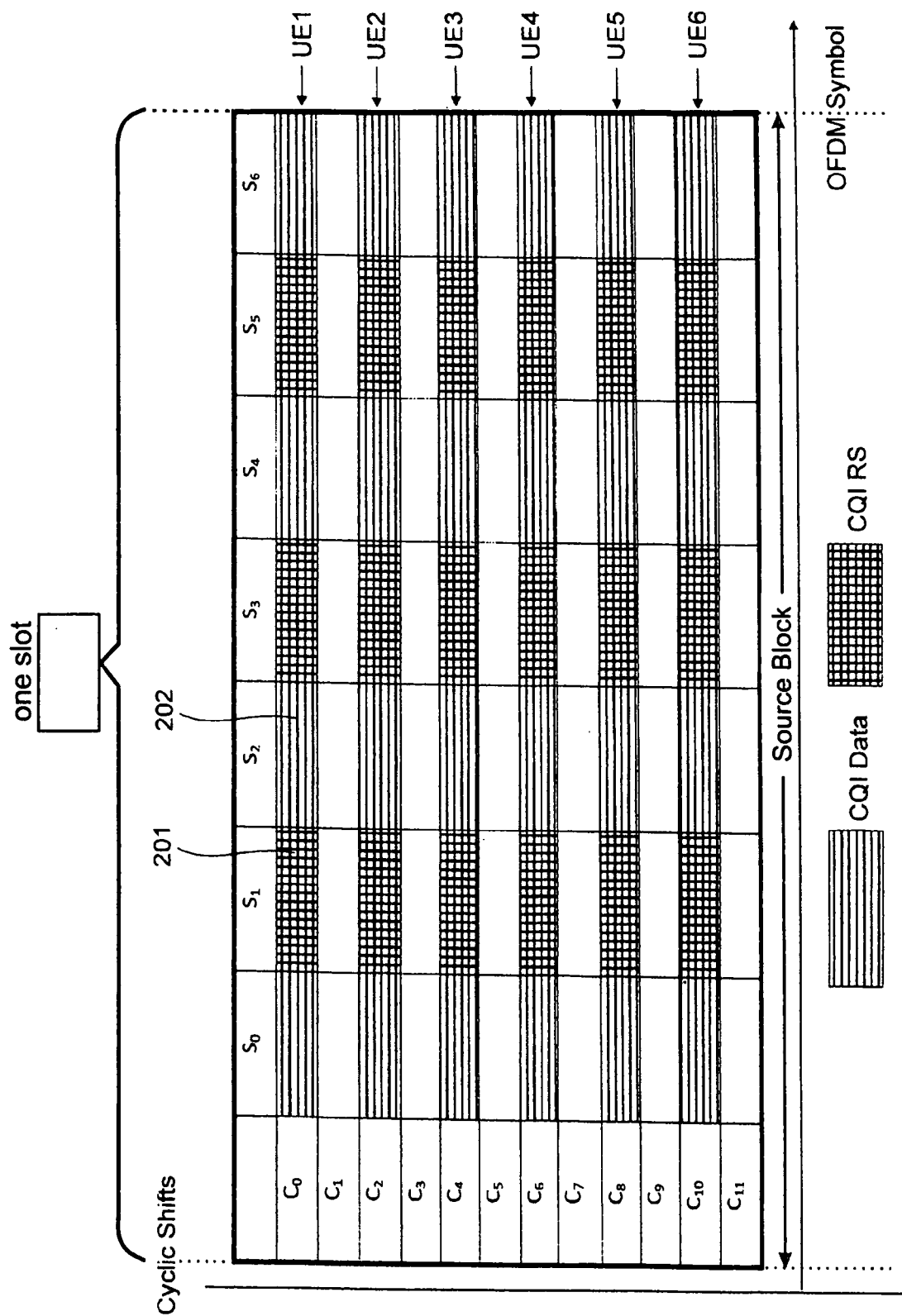
FIG. 3 is an illustration showing an example of multiplexing six units of user equipment into one resource block containing channel quality indication signals within one slot.

The physical uplink control channel, PUCCH, carries uplink control information. All PUCCH formats use a cyclic shift (CS) of a sequence in each OFDM symbol. FIG. 3 is an illustration showing an example of multiplexing six user equipments (UEs) into one resource block containing channel quality indication (CQI) signals within one slot. In FIG. 3, the PUCCH occupies twelve subcarriers in the resource block and twelve cyclic shift resources ($c_0$ through $c_{11}$) exist in the resource block. The CQI signals include both of CQI data signals (e.g., CQI data signal 201) occupying several symbol elements (e.g., $s_0$) within the OFDM symbols and CQI reference signals (e.g., CQI reference signal 202) occupying several symbol elements (e.g., $s_1$). Six UEs (i.e., UE 1 through UE 6) are multiplexed in the resource block. Here, only six out of twelve cyclic shifts are actually used.

Figure 4:
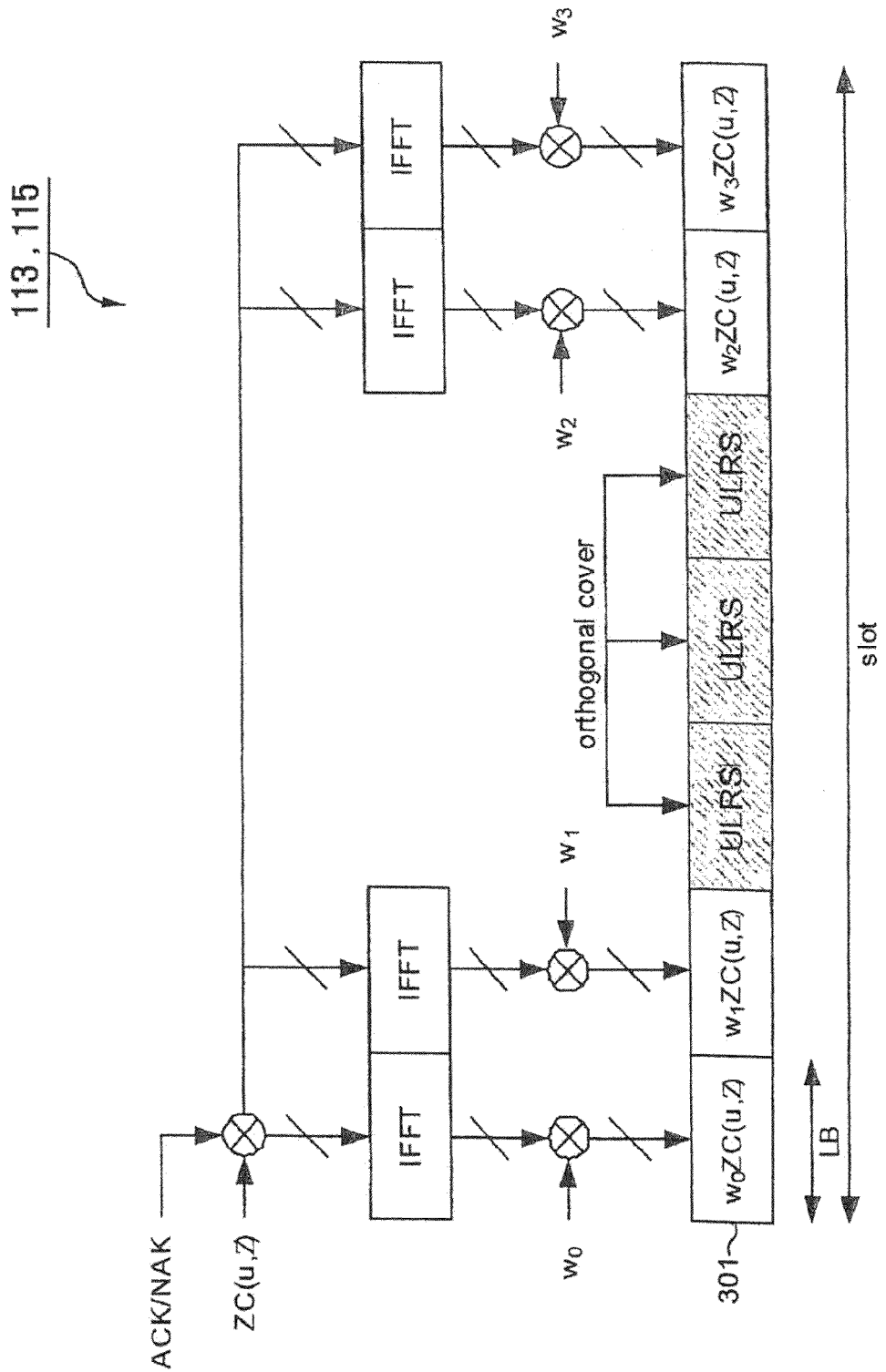
FIG. 4 is a block diagram illustrating the scenario for the transmission of physical uplink acknowledgement and non-acknowledgement channels and reference signals for acknowledgement and non-acknowledgement demodulation.

FIG. 4, cited from reference [3], shows the working assumption on the transmission block of uplink ACK/NAK channels and reference signals. Here, the position of the reference signal long block is not determined, therefore, FIG. 4 is only for illustrative purposes. Serial-to-parallel convertor 113 and IFFT unit 115 transform a frequency domain representation of the ACK/NAK signals and the uplink reference signals to a time domain representation, and map the ACK/NAK signals and the uplink reference signals into the transmission block. ACK/NAK signals and the uplink reference signals (UL RS) for ACK/NAK demodulation are multiplexed on code channels 301 constructed by both a cyclic shift of a base sequence (e.g., Zadoff-Chu sequence) and an orthogonal cover. ACK/NAK signals and the uplink reference signals are multiplexed on code channels 301 constructed by both of a Zadoff-Chu sequence and an orthogonal cover. For ACK/NAK channels, a Zadoff-Chu sequence with a particular cyclic shift, is placed in sub-carriers and an orthogonal cover is applied to time domain long block (LB). The IFFTs transform a frequency domain representation of the input sequence to a time domain representation. The orthogonal cover may be used for both of UL RS and for PUCCH data, the actual code of the orthogonal cover used only for UL RS is different from {w0, w1, w2, w3} which is used only for PUCCH data.

Here, FIG. 3 shows an example of a mapping method exclusively adapted to resource blocks only containing CQI channels, and FIG. 4 shows an example of a mapping method for ACK/NAK channels.

One important aspect of system design is resource remapping on a symbol, slot or subframe-level. Section 5.4.1 of reference [1], which includes the slot-level remapping of the ACK/NAK channel in the uplink control PUCCH channel of LTE, is cited below for ease of exposition.

"5.4 Physical Uplink Control Channel

The physical resources used for PUCCH depends on two parameters, $N_{RB}^{(2)}$ and $N_{cs}^{(1)}$, given by higher layers. The variable $N_{RB}^{(2)} \geq 0$ denotes the bandwidth in terms of resource blocks that are reserved exclusively for PUCCH formats 2/2a/2b transmission in each slot. The variable $N_{cs}^{(1)}$ denotes the number of cyclic shift used for PUCCH formats 1/1a/1b in a resource block used for a mix of formats 1/1a/1b and 2/2a/2b. The value of $N_{cs}^{(1)}$ is an integer multiple of $\Delta_{shift}^{PUCCH}$ within the range of {0, 1, . . . , 8}, where $\Delta_{shift}^{PUCCH}$ is defined in section 5.4.1. No mixed resource block is present if $N_{cs}^{(1)}=0$. At most one resource block in each slot supports a mix of formats 1/1a/1b and 2/2a/2b. Resources used for transmission of PUCCH format 1/1a/1b and 2/2a/2b are represented by the non-negative indices $n_{PUCCH}^{(1)}$ and $$n_{PUCCH}^2 < N_{RB}^{(2)} N_{sc}^{RB} + \left\lceil \frac{N_{cs}^{(1)}}{8} \right\rceil \cdot (N_{sc}^{RB} - N_{cs}^{(1)} - 2),$$

respectively.

5.4.1 PUCCH Formats 1, 1a and 1b

For PUCCH format 1, information is carried by the presence/absence of transmission of PUCCH from the UE. In the remainder of this section, d(0)=1 shall be assumed for PUCCH format 1.

For PUCCH formats 1a and 1b, one or two explicit bits are transmitted, respectively. The block of bits b(0), . . . , b($M_{bit}$−1) shall be modulated as described in section 7.1, resulting in a complex-valued symbol d(0). The modulation schemes for the different PUCCH formats are given by Table 5.4-1.

The complex-valued symbol d(0) shall be multiplied with a cyclically shifted length $N_{seq}^{PUCCH}=12$ sequence $r_{u,v}^{(\alpha)}(n)$ according to:

$$y(n)=d(0) \cdot r_{u,v}^{(\alpha)}(n), n=0,1,\ldots,N_{seq}^{PUCCH}, \quad (1)$$

where $r_{u,v}^{(\alpha)}(n)$ is defined by section 5.5.1 with $M_{sc}^{RS}=N_{seq}^{PUCCH}$. The cyclic shift α varies between symbols and slots as defined below.

The block of complex-valued symbols y(0), . . . , y($N_{seq}^{PUCCH}$−1) shall be block-wise spread with the orthogonal sequence $w_{n_{oc}}(i)$ according to $$z(m' \cdot N_{SF}^{PUCCH} \cdot N_{seq}^{PUCCH} + m \cdot N_{seq}^{PUCCH} + n) = w_{n_{oc}}(m) \cdot y(n), \quad (2)$$

where
m=0, . . . , $N_{SF}^{PUCCH}$−1
n=0, . . . , $N_{seq}^{PUCCH}$−1,
m'=0,1
and $N_{SF}^{PUCCH}=4$. The sequence $w_{n_{oc}}(i)$ is given by Table 5.4.1-1.

Resources used for transmission of PUCCH format 1, 1a and 1b are identified by a resource index $n_{PUCCH}^{(1)}$ from which the orthogonal sequence index $n_{oc}(n_s)$ and the cyclic shift $\alpha(n_s)$ are determined according to:

$$n_{oc}(n_s) = \begin{cases} \lfloor n'(n_s) \cdot \Delta_{shift}^{PUCCH} / N' \rfloor & \text{for normal cyclic prefix,} \\ 2 \cdot \lfloor n'(n_s) \cdot \Delta_{shift}^{PUCCH} / N' \rfloor & \text{for extended cyclic prefix,} \end{cases} \quad (3)$$

-continued $$\alpha(n_s) = 2\pi \cdot n_{cs}(n_s)/N_{sc}^{RB}, \quad (4)$$

$$n_{cs}(n_s) = \begin{cases} \text{for normal cyclic prefix,} \\ [n_{cs}^{cell}(n_s, l) + (n'(n_s) \cdot \Delta_{shift}^{PUCCH} + \\ \delta_{offset}^{PUCCH} + (n_{oc}(n_s) \bmod \Delta_{shift}^{PUCCH})) \\ \bmod N'] \bmod N_{sc}^{RB} \\ \text{for extended cyclic prefix,} \\ [n_{cs}^{cell}(n_s, l) + (n'(n_s) \cdot \Delta_{shift}^{PUCCH} + \delta_{offset}^{PUCCH} + \\ n_{oc}(n_s)/2) \bmod N'] \bmod N_{sc}^{RB} \end{cases} \quad (5)$$

where $$N' = \begin{cases} N_{cs}^{(1)} & \text{if } n_{PUCCH}^{(1)} < c \cdot N_{cs}^{(1)}/\Delta_{shift}^{PUCCH} \\ N_{sc}^{RB} & \text{otherwise} \end{cases} \quad (6)$$

$$c = \begin{cases} 3 & \text{normal cyclic prefix} \\ 2 & \text{extended cyclic prefix} \end{cases} \quad (7)$$

with N' being the number of cyclic shifts and c being the number of orthogonal covers.

The resource indices within the two resource blocks in the two slots of a subframe to which the PUCCH is mapped are given by $$n'(n_s) = \begin{cases} \text{if } n_{PUCCH}^{(1)} < c \cdot N_{cs}^{(1)}/\Delta_{shift}^{PUCCH}, \\ n_{PUCCH}^{(1)} \\ \text{otherwise,} \\ (n_{PUCCH}^{(1)} - c \cdot N_{cs}^{(1)}/\Delta_{shift}^{PUCCH}) \bmod (c \cdot N_{sc}^{RB}/\Delta_{shift}^{PUCCH}) \end{cases} \quad (8)$$

when $n_s \bmod 2 = 0$; and by $$n'(n_s) = \begin{cases} \text{for normal cyclic prefix and} \\ n_{PUCCH}^{(1)} \geq c \cdot N_{cs}^{(1)}/\Delta_{shift}^{PUCCH}, \\ [3(n'(n_s) + 1)] \bmod (3N_{sc}^{RB}/\Delta_{shift}^{PUCCH} + 1) - 1 \\ \text{otherwise,} \\ n'(n_s) \end{cases} \quad (9)$$

when $n_s \bmod 2 = 1$
The quantities $$\Delta_{shift}^{PUCCH} \in \begin{cases} \{[1], 2, 3\} & \text{for normal cyclic prefix} \\ \{2, 3\} & \text{for extended cyclic prefix} \end{cases} \quad (10)$$

$$\delta_{offset}^{PUCCH} \in \{0, 1, \ldots, \Delta_{shift}^{PUCCH} - 1\} \quad (11)$$

are set by higher layers with $\Delta_{shift}^{PUCCH}$ being the number of cyclic shifts between PUCCHs and $\delta_{offset}^{PUCCH}$ being offset for allocating cyclic shifts to PUCCHs."

In the present invention, novel slot-level remapping methods are proposed to provide a better intra-cell randomization, especially for ACK/NAK resource blocks with extended cyclic prefix, and for normal cyclic prefix cases with mixed resource block where the ACK/NAK and CQI coexist in a single resource block.

Equations (8) and (9) are referred by the present invention.

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings.

Figure 5:
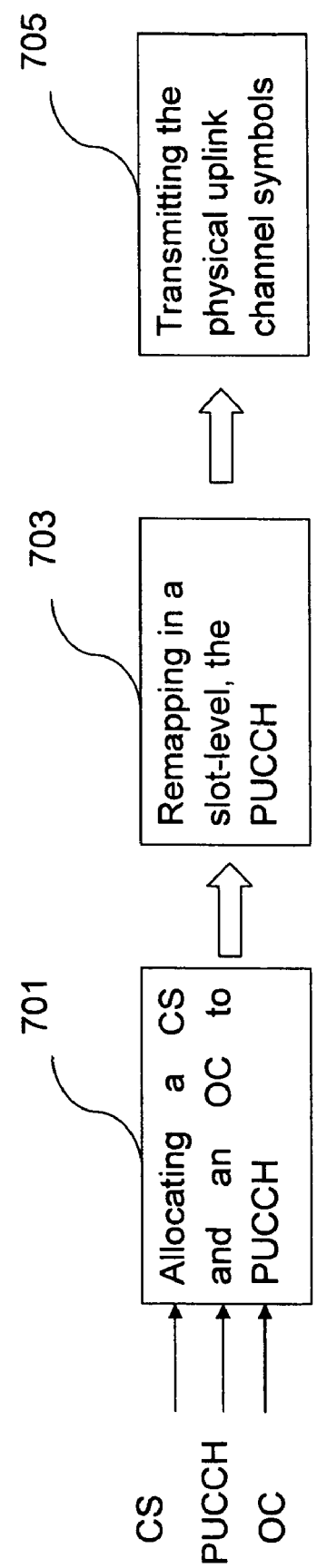
FIG. 5 is a flow chart illustrating a transmitting method of physical uplink channel signals in accordance with the embodiments of the present invention.

FIG. 5 is a flow chart illustrating a transmitting method of physical uplink channel signals in accordance with the embodiments of the present invention. In step 701, the transmitter allocates a cyclic shift and an orthogonal cover to physical uplink control channels using allocating section; in step 703, the transmitter maps in a slot-level, the physical uplink control channels into two resource blocks respectively located at two slots of a subframe using remapper section; and in step 705, the transmitter transmits the mapped physical uplink control channels using transmitting antenna unit. The present invention introduces novel remapping methods for performing step 703.

Method C

In one embodiment of the current invention, a slot-level remapping method, method C, is proposed. In this method, the resource indices within the two resource blocks respectively in the two slots of a subframe to which the PUCCH is mapped are given by:

when $n_s \bmod 2 = 0$, resource indices of the physical uplink control channels within a first slot of the two slots of the subframe are established by:

$$n'(n_s) = \begin{cases} \text{if } n_{PUCCH}^{(1)} < c \cdot \frac{N_{cs}^{(1)}}{\Delta_{shift}^{PUCCH}}, \\ n_{PUCCH}^{(1)} \\ \text{otherwise,} \\ \left(n_{PUCCH}^{(1)} - c \cdot \frac{N_{cs}^{(1)}}{\Delta_{shift}^{PUCCH}}\right) \bmod \left(c \cdot \frac{N_{sc}^{RB}}{\Delta_{shift}^{PUCCH}}\right), \end{cases} \quad (12)$$

and when $n_s \bmod 2 = 1$, the resource indices of the physical uplink control channels within a second slot of the two slots of the subframe to which the physical uplink channel symbols are to remapped by:

$$n'(n_s) = f(n'(n_s - 1)) = \quad (13)$$

$$\begin{cases} \text{for normal cyclic prefix and } n_{PUCCH}^{(1)} \geq c \cdot \frac{N_{cs}^{(1)}}{\Delta_{shift}^{PUCCH}}, \\ [3(n'(n_s - 1) + 1)] \bmod \left(\frac{3N_{sc}^{RB}}{\Delta_{shift}^{PUCCH}} + 1\right) - 1 \\ \text{otherwise} \\ \left\{d + \left\lfloor \frac{n'(n_s - 1)}{c} \right\rfloor + [n'(n_s - 1) \bmod c] \cdot \left(\frac{N'}{\Delta_{shift}^{PUCCH}}\right)\right\} \bmod \left(\frac{cN'}{\Delta_{shift}^{PUCCH}}\right) \end{cases}$$

where $$d = \begin{cases} d_1 & \text{for normal cyclic prefix} \\ d_2 & \text{for extended cyclic prefix} \end{cases} \quad (14)$$

with $d_1, d_2$ being a pair of two independent parameters. There are several examples of the parameter pair $d_1, d_2$. One example of the parameter pair $d_1, d_2$ is $d_1=2, d_2=2$. Another example of the parameter pair $d_1, d_2$ is $d_1=2, d_2=2$. Another example of the parameter pair $d_1, d_2$ is $d_1=1, d_2=0$.

Here, $n_s$ is a slot index within a subframe, $n_{PUCCH}^{(1)}$ is a resource index for physical uplink control channel format 1, 1a and 1b, $N_{cs}^{(1)}$ is a number of cyclic shifts used for the physical uplink control channel format 1, 1a and 1b in the resource block, and $N_{sc}^{RB}$ is a resource block size in the frequency domain.

Method D

In another embodiment of the current invention, a slot-level remapping method, method D, is proposed. In this method, the resource indices within the two resource blocks respectively in the two slots of a subframe to which the PUCCH is mapped are given by:
when $n_s$ mod $2=0$, the resource indices of the physical uplink control channels within a first slot of the two slots of the subframe to which the physical uplink channel symbols are remapped by:

$$n'(n_s) = \begin{cases} \text{if } n_{PUCCH}^{(1)} < c \cdot \frac{N_{cs}^{(1)}}{\Delta_{shift}^{PUCCH}}, \\ n_{PUCCH}^{(1)} \\ \text{otherwise,} \\ \left(n_{PUCCH}^{(1)} - c \cdot \frac{N_{cs}^{(1)}}{\Delta_{shift}^{PUCCH}}\right) \bmod \left(c \cdot \frac{N_{sc}^{RB}}{\Delta_{shift}^{PUCCH}}\right) \end{cases} \quad (15)$$

and when $n_s$ mod $2=1$, the resource indices of the physical uplink control channels within a second slot of the two slots of the subframe to which the physical uplink channel symbols are remapped by:

$$n'(n_s) = f(n'(n_s - 1)) = \quad (16)$$

$$\begin{cases} \text{for normal cyclic prefix and } n_{PUCCH}^{(1)} \geq c \cdot \frac{N_{cs}^{(1)}}{\Delta_{shift}^{PUCCH}}, \\ [3(n'(n_s - 1) + 1)] \bmod \left(\frac{3N_{sc}^{RB}}{\Delta_{shift}^{PUCCH}} + 1\right) - 1 \\ \text{otherwise,} \\ \left\lfloor \frac{h(n'(n_s - 1))}{c} \right\rfloor + [h(n'(n_s - 1)) \bmod c] \cdot \left(\frac{N'}{\Delta_{shift}^{PUCCH}}\right) \end{cases}$$

Where $h(n'(n_s-1)) = (n'(n_s-1)+d) \bmod (cN'/\Delta_{shift}^{PUCCH})$, (17)

and $$d = \begin{cases} d_3 & \text{for normal cyclic prefix} \\ d_4 & \text{for extended cyclic prefix} \end{cases}$$

with $d_3, d_4$ being a pair of two independent parameters. There are several examples of the parameter pair $d_3, d_4$. One example of the parameter pair $d_3, d_4$ is $d_3=1, d_4=0$. Another example of the parameter pair $d_3, d_4$ is $d_3=1, d_4=1$.

In this method, the resource indices within the two resource blocks respectively in the two slots of a subframe to which the PUCCH is mapped may be also given by:
when $n_s$ mod $2=0$, the resource indices of the physical uplink control channels within the first slot of the two slots of the subframe to which the physical uplink channel symbols are remapped by:

$$n'(n_s) = \begin{cases} \text{if } n_{PUCCH}^{(1)} < c \cdot \frac{N_{cs}^{(1)}}{\Delta_{shift}^{PUCCH}}, \\ n_{PUCCH}^{(1)} \\ \text{otherwise,} \\ \left(n_{PUCCH}^{(1)} - c \cdot \frac{N_{cs}^{(1)}}{\Delta_{shift}^{PUCCH}}\right) \bmod \left(c \cdot \frac{N_{sc}^{RB}}{\Delta_{shift}^{PUCCH}}\right) \end{cases} \quad (18)$$

and when $n_s$ mod $2=1$, the resource indices of the physical uplink control channels within the second slot of the two slots of the subframe to which the physical uplink channel symbols are remapped by:

$$n'(n_s) = \begin{cases} n_{PUCCH}^{(1)} \geq c \cdot \frac{N_{cs}^{(1)}}{\Delta_{shift}^{PUCCH}}, \\ [c(n'(n_s - 1) + 1)] \bmod \left(\frac{cN_{sc}^{RB}}{\Delta_{shift}^{PUCCH}} + 1\right) - 1 \\ \text{otherwise,} \\ \left\lfloor \frac{h}{c} \right\rfloor + (h \bmod c) \cdot \frac{N'}{\Delta_{shift}^{PUCCH}} \end{cases} \quad (19)$$

where:

$h = (n'(n_s-1)+d) \bmod (cN'/\Delta_{shift}^{PUCCH})$ (20)

with $d=2$ for normal CP and $d=0$ for extended CP.

Method D has been accepted by 3GPP standards presented by document TSG RAN WG1 #53b R1-082660 developed at meeting held in Warsaw, Poland, from Jun. 30, 2008 through Jul. 4, 2008. On page 2 of R1-082660, it is stated that:

"The resource indices in the two slots of a subframe to which the PUCCH is mapped are given by $$n'(n_s) = \begin{cases} \text{if } n_{PUCCH}^{(1)} < c \cdot \frac{N_{cs}^{(1)}}{\Delta_{shift}^{PUCCH}}, \\ n_{PUCCH}^{(1)} \\ \text{otherwise,} \\ \left(n_{PUCCH}^{(1)} - c \cdot \frac{N_{cs}^{(1)}}{\Delta_{shift}^{PUCCH}}\right) \bmod \left(c \cdot \frac{N_{sc}^{RB}}{\Delta_{shift}^{PUCCH}}\right) \end{cases}$$

for $n_s$ mod $2=0$ and by $$n'(n_s) = \begin{cases} n_{PUCCH}^{(1)} \geq c \cdot \frac{N_{cs}^{(1)}}{\Delta_{shift}^{PUCCH}} \\ [c(n'(n_s - 1) + 1)] \bmod \left(\frac{cN_{sc}^{RB}}{\Delta_{shift}^{PUCCH}} + 1\right) - 1 \\ \text{otherwise,} \\ \left\lfloor \frac{h}{c} \right\rfloor + (h \bmod c) \cdot \frac{N'}{\Delta_{shift}^{PUCCH}} \end{cases}$$

for $n_s$ mod $2=1$, where $h = (n'(n-1)+d) \bmod (cN'/\Delta_{shift}^{PUCCH})$, with d=2 for normal CP and d=0 for extended CP.
Note, $$\Delta_{shift}^{PUCCH} \in \begin{cases} \{1, 2, 3\} & \text{for normal cyclic prefix} \\ \{1, 2, 3\} & \text{for extended cyclic prefix} \end{cases}$$

$$\delta_{offset}^{PUCCH} \in \{0, 1, \ldots, \Delta_{shift}^{PUCCH} - 1\}."$$

In the R1-082660 of 3GPP standards, the form of equation (16) is rewritten to:

$$n'(n_s) = \begin{cases} n_{PUCCH}^{(1)} \geq c \cdot \frac{N_{cs}^{(1)}}{\Delta_{shift}^{PUCCH}}, \\ [c(n'(n_s-1)+1)] \bmod \left(\frac{cN_{sc}^{RB}}{\Delta_{shift}^{PUCCH}} + 1\right) - 1 \\ \text{otherwise,} \\ \left\lfloor \frac{h}{c} \right\rfloor + (h \bmod c) \cdot \frac{N'}{\Delta_{shift}^{PUCCH}} \end{cases}$$

for $n_s \bmod 2=1$,
where $h=(n'(n_s-1)+d) \bmod (cN'/\Delta_{shift}^{PUCCH})$, while the contents of equation (16) are not altered. Here, $d_3=2$ is for normal cyclic prefix, and $d_4=0$ is for extended cyclic prefix.

In section 5.4.1 of 3GPP standards version TS 36.211 V8.3.0 (2008-05), published on Jun. 18, 2008, it is stated that:

"The resource indices within the two resource blocks in the two slots of a subframe to which the PUCCH is mapped are given by $$n'(n_s) = \begin{cases} \text{if } n_{PUCCH}^{(1)} < c \cdot \frac{N_{cs}^{(1)}}{\Delta_{shift}^{PUCCH}}, \\ n_{PUCCH}^{(1)} \\ \text{otherwise,} \\ \left(n_{PUCCH}^{(1)} - c \cdot \frac{N_{cs}^{(1)}}{\Delta_{shift}^{PUCCH}}\right) \bmod \left(c \cdot \frac{N_{sc}^{RB}}{\Delta_{shift}^{PUCCH}}\right) \end{cases}$$

for $n_s \bmod 2=0$ and by $$n'(n_s) = \begin{cases} \text{for normal cyclic prefix and } n_{PUCCH}^{(1)} \geq c \cdot \frac{N_{cs}^{(1)}}{\Delta_{shift}^{PUCCH}}, \\ [3(n'(n_s-1)+1)] \bmod \left(\frac{3N_{sc}^{RB}}{\Delta_{shift}^{PUCCH}} + 1\right) - 1 \\ \text{otherwise,} \\ n'(n_s-1) \end{cases}$$

for $n_s \bmod 2=1$.
The quantities $$\Delta_{shift}^{PUCCH} \in \begin{cases} \{1, 2, 3\} & \text{for normal cyclic prefix} \\ \{1, 2, 3\} & \text{for extended cyclic prefix} \end{cases}$$

$$\delta_{offset}^{PUCCH} \in \{0, 1, \ldots, \Delta_{shift}^{PUCCH} - 1\}$$

are set by higher layers."

The present invention has been implanted in 3GPP standards version TS 36.211 V8.4.0 (2008-09), published on Sep. 24, 2008. In section 5.4.1 of 3GPP standards TS 36.211 V8.4.0, it is stated that:

"The resource indices within the two resource blocks in the two slots of a subframe to which the PUCCH is mapped are given by $$n'(n_s) = \begin{cases} \text{if } n_{PUCCH}^{(1)} < c \cdot \frac{N_{cs}^{(1)}}{\Delta_{shift}^{PUCCH}}, \\ n_{PUCCH}^{(1)} \\ \text{otherwise,} \\ \left(n_{PUCCH}^{(1)} - c \cdot \frac{N_{cs}^{(1)}}{\Delta_{shift}^{PUCCH}}\right) \bmod \left(c \cdot \frac{N_{sc}^{RB}}{\Delta_{shift}^{PUCCH}}\right) \end{cases}$$

for $n_s \bmod 2=0$ and by $$n'(n_s) = \begin{cases} n_{PUCCH}^{(1)} \geq c \cdot \frac{N_{cs}^{(1)}}{\Delta_{shift}^{PUCCH}}, \\ [c(n'(n_s-1)+1)] \bmod \left(\frac{cN_{sc}^{RB}}{\Delta_{shift}^{PUCCH}} + 1\right) - 1 \\ \text{otherwise,} \\ \left\lfloor \frac{h}{c} \right\rfloor + (h \bmod c) \frac{N'}{\Delta_{shift}^{PUCCH}} \end{cases}$$

for $n_s \bmod 2=1$, where $h=(n'(n_s-1)+d) \bmod (cN'/\Delta_{shift}^{PUCCH})$, with d=2 for normal CP and d=0 for extended CP.
The quantities $$\Delta_{shift}^{PUCCH} \in \begin{cases} \{1, 2, 3\} & \text{for normal cyclic prefix} \\ \{1, 2, 3\} & \text{for extended cyclic prefix} \end{cases}$$

$$\delta_{offset}^{PUCCH} \in \{0, 1, \ldots, \Delta_{shift}^{PUCCH} - 1\}$$

are set by higher layers."

Comparing 3GPP standards version TS 36.211 V8.4.0 (2008-09) and 3GPP standards version TS 36.211 V8.4.0 (2008-05), the latest 3GPP standards version TS 36.211 V8.4.0 (2008-09) implanted the equations for the resource indices for both of the extended CP case and mixed RB case, and introduces a new parameter "d" for the mapping of the resource indices of the physical uplink control channels within one of two slots of a subframe by implanting the present invention, and the resource indices are given by $$n'(n_s) = \begin{cases} \text{when } n_{PUCCH}^{(1)} \geq c \cdot \frac{N_{cs}^{(1)}}{\Delta_{shift}^{PUCCH}}, \\ [c(n'(n_s-1)+1)] \bmod \left(\frac{cN_{sc}^{RB}}{\Delta_{shift}^{PUCCH}} + 1\right) - 1 \\ \text{otherwise,} \\ \left\lfloor \frac{h}{c} \right\rfloor + (h \bmod c) \frac{N'}{\Delta_{shift}^{PUCCH}} \end{cases}$$

for $n_s \bmod 2=1$, where $h=(n'(n_s-1)+d) \bmod (cN'/\Delta_{shift}^{PUCCH})$, with d=2 for normal CP and d=0 for extended CP. By introducing the above stated equations and the parameter "d" for the mapping of the resource indices, the present invention achieves a better randomization and a better performance of the mapping of the resource blocks within the communication system.

Method E

In another embodiment of the current invention, a slot-level remapping method, method E, is proposed. In this method, the resource indices within the two resource blocks respectively in the two slots of a subframe to which the PUCCH is mapped are given by:

when $n_s \bmod 2 = 0$, the resource indices of the physical uplink control channels within a first slot of the two slots of the subframe to which the physical uplink channel symbols are remapped by:

$$n'(n_s) = \begin{cases} \text{if } n_{PUCCH}^{(1)} < c \cdot \frac{N_{cs}^{(1)}}{\Delta_{shift}^{PUCCH}}, \\ n_{PUCCH}^{(1)} \\ \text{otherwise,} \\ \left(n_{PUCCH}^{(1)} - c \cdot \frac{N_{cs}^{(1)}}{\Delta_{shift}^{PUCCH}}\right) \bmod \left(c \cdot \frac{N_{sc}^{RB}}{\Delta_{shift}^{PUCCH}}\right) \end{cases} \quad (21)$$

and when $n_s \bmod 2 = 1$, the resource indices of the physical uplink control channels within a second slot of the two slots of the subframe to which the physical uplink channel symbols are remapped by:

$$n'(n_s) = f(n'(n_s - 1)) = \quad (22)$$

$$\begin{cases} \text{for normal cyclic prefix and } n_{PUCCH}^{(1)} \geq c \cdot \frac{N_{cs}^{(1)}}{\Delta_{shift}^{PUCCH}}, \\ [3(n'(n_s - 1) + 1)] \bmod \left(\frac{3N_{sc}^{RB}}{\Delta_{shift}^{PUCCH}} + 1\right) - 1 \\ \text{otherwise,} \\ \left\{e + \left\lfloor \frac{h(n'(n_s - 1))}{c} \right\rfloor + [h(n'(n_s - 1)) \bmod c] \cdot \left(\frac{N'}{\Delta_{shift}^{PUCCH}}\right)\right\} \bmod \left(\frac{cN'}{\Delta_{shift}^{PUCCH}}\right) \end{cases}$$

where $h(n'(n_s-1)) = (n'(n_s-1)+d) \bmod (cN'/\Delta_{shift}^{PUCCH})$, and $$d = \begin{cases} d_3 & \text{for normal cyclic prefix} \\ d_4 & \text{for extended cyclic prefix} \end{cases}, \quad (23)$$

$$e = \begin{cases} e_3 & \text{for normal cyclic prefix} \\ e_4 & \text{for extended cyclic prefix} \end{cases}, \quad (24)$$

with $d_3, d_4$ being a pair of two independent parameters, and $e_3, e_4$ being another pair of two independent parameters.

There are several examples of the parameter pair $d_3, d_4$.

One example of the parameter pair $d_3, d_4$ is $d_3=1, d_4=0$.

Another example of the parameter pair $d_3, d_4$ is $d_3=1, d_4=1$.

There are several examples of the parameter pair $e_3, e_4$.

One example of the parameter pair $e_3, e_4$ is $e_3=1, e_4=0$.

Another example of the parameter pair $e_3, e_4$ is $e_3=2, e_4=2$.

Examples of Method C

Six examples for illustrating method C are listed below. As shown in these examples, the proposed method C may be generally adapted to a complex 3GPP LTE physical uplink where ACK/NAK resource blocks may be applied by the extended cyclic prefix, mixed resource blocks (where the ACK/NAK and CQI channels coexist) may be applied by the normal cyclic prefix, or mixed resource blocks (where the ACK/NAK and CQI channels coexist) may be applied by the extended cyclic prefix. Examples One through Six of Method C are on the assumption that the parameter pair $d_1=1, d_2=0$.

EXAMPLE ONE

In the first example, only ACK/NAK channels are carried by the resource block and the extended cyclic prefix is applied.

Here, $\Delta_{shift}^{PUCCH}=2$, $N'=12$, $c=2$, and thus $n'(0)$ and $n'(1)=f(n'(0))$ are achieved as:

| n'(0) | 0 | 1 | 2 | 3 | 4 | 5 | 6 | 7 | 8 | 9 | 10 | 11 |
|---|---|---|---|---|---|---|---|---|---|---|---|---|
| n'(1) = f(n'(0)) | 0 | 6 | 1 | 7 | 2 | 8 | 3 | 9 | 4 | 10 | 5 | 11 |

TABLE 1

Example of CS/OC Sequence Remapping, $\Delta_{shift}^{PUCCH} = 2$, Extended CP

| Cell specific cyclic shift offset | | Slot 0 | | Slot 1 | |
|---|---|---|---|---|---|
| $\delta_{offset} = 1$ | $\delta_{offset} = 0$ | $OC_{index} = 0$ | $OC_{index} = 2$ | $OC_{index} = 0$ | $OC_{index} = 2$ |
| $CS_{index} = 1$ | $CS_{index} = 0$ | n'(0) = 0 | | n'(1) = f(n'(0)) = 0 | |
| 2 | 1 | | n'(0) = 6 | | 1 |
| 3 | 2 | 1 | | 2 | |
| 4 | 3 | | 7 | | 3 |
| 5 | 4 | 2 | | 4 | |
| 6 | 5 | | 8 | | 5 |
| 7 | 6 | 3 | | 6 | |
| 8 | 7 | | 9 | | 7 |
| 9 | 8 | 4 | | 8 | |
| 10 | 9 | | 10 | | 9 |
| 11 | 10 | 5 | | 10 | |
| | 11 | | 11 | | 11 |

Table 1 shows the example of CS/OC sequence remapping, where $\Delta_{shift}^{PUCCH}$ and an extended cyclic prefix is applied. The resource indices within the two resource blocks respectively in the two slots of a subframe to which the PUCCH is mapped are given by Table 1.

EXAMPLE TWO

In the second example, only ACK/NAK channels are carried by the resource block and the extended cyclic prefix is applied.
Here, $\Delta_{shift}^{PUCCH}=3$, N'=12, c=2, and thus n'(0) and n'(1)=f(n'(0)) are achieved as:

|  | n'(0) |  |  |  |  |  |  |  |
|---|---|---|---|---|---|---|---|---|
|  | 0 | 1 | 2 | 3 | 4 | 5 | 6 | 7 |
| n'(1) = f (n'(0)) | 0 | 4 | 1 | 5 | 2 | 6 | 3 | 7 |

The resource indices within the two resource blocks respectively in the two slots of a subframe to which the PUCCH is mapped are given by Table 2.

EXAMPLE THREE

In the third example, ACK/NAK channels and CQI channels are carried by the resource block and the extended cyclic prefix is applied.
Here, $\Delta_{shift}^{PUCCH}=2$, N'=6, c=2, and thus n'(0) and n'(1)=f(n'(0)) are achieved as:

|  | n'(0) |  |  |  |  |  |
|---|---|---|---|---|---|---|
|  | 0 | 1 | 2 | 3 | 4 | 5 |
| n'(1) = f (n'(0)) | 0 | 3 | 1 | 4 | 2 | 5 |

TABLE 2

Example of CS/OC Sequence Remapping, $\Delta_{shift}^{PUCCH} = 3$, Extended CP

| Cell specific cyclic shift offset | | | slot 0 | | slot 1 | |
|---|---|---|---|---|---|---|
| $\delta_{offset}=2$ | $\delta_{offset}=1$ | $\delta_{offset}=0$ | $OC_{index}=0$ | $OC_{index}=2$ | $OC_{index}=0$ | $OC_{index}=2$ |
| $CS_{index}=2$ | $CS_{index}=1$ | $CS_{index}=0$ | n'(0) = 0 |  | n'(1) = f (n'(0)) = 0 |  |
| 3 | 2 | 1 |  | n'(0) = 4 |  | 1 |
| 4 | 3 | 2 |  |  |  |  |
| 5 | 4 | 3 | 1 |  | 2 |  |
| 6 | 5 | 4 |  | 5 |  | 3 |
| 7 | 6 | 5 |  |  |  |  |
| 8 | 7 | 6 | 2 |  | 4 |  |
| 9 | 8 | 7 |  | 6 |  | 5 |
| 10 | 9 | 8 |  |  |  |  |
| 11 | 10 | 9 | 3 |  | 6 |  |
| 0 | 11 | 10 |  | 7 |  | 7 |
| 1 | 0 | 11 |  |  |  |  |

Table 2 shows the example of CS/OC sequence remapping, where $\Delta_{shift}^{PUCCH}=3$ and an extended cyclic prefix is applied.

TABLE 3

Example of CS/OC Sequence Remapping, $\Delta_{shift}^{PUCCH} = 2$, Extended CP

| Cell specific cyclic shift offset | | slot 0 | | slot 1 | |
|---|---|---|---|---|---|
| $\delta_{offset}=1$ | $\delta_{offset}=0$ | $OC_{index}=0$ | $OC_{index}=2$ | $OC_{index}=0$ | $OC_{index}=2$ |
| $CS_{index}=1$ | $CS_{index}=0$ | n'(0) = 0 |  | n'(1) = f (n'(0)) = 0 |  |
| 2 | 1 |  | n'(0) = 3 |  | 1 |
| 3 | 2 | 1 |  | 2 |  |
| 4 | 3 |  | 4 |  | 3 |
| 5 | 4 | 2 |  | 4 |  |
| 6 | 5 |  | 5 |  | 5 |
| 7 | 6 |  |  |  |  |
| 8 | 7 | CQI |  | CQI |  |
| 9 | 8 |  |  |  |  |
| 10 | 9 |  |  |  |  |
| 11 | 10 |  |  |  |  |
| 0 | 11 |  |  |  |  |

Table 3 shows the example of CS/OC sequence remapping, where $\Delta_{shift}^{PUCCH}=2$ and an extended cyclic prefix is applied. The resource indices within the two resource blocks respectively in the two slots of a subframe to which the PUCCH is mapped are given by Table 3.

EXAMPLE FOUR

In the fourth example, ACK/NAK channels and CQI channels are carried by the resource block and the extended cyclic prefix is applied.
Here, $\Delta_{shift}^{PUCCH}=3$, N'=6, c=2, and thus n'(0) and n'(1)=f(n'(0)) are achieved as:

| n'(0)         | 0 | 1 | 2 | 3 |
|---------------|---|---|---|---|
| n'(1) = f(n'(0)) | 0 | 2 | 1 | 3 |

The resource indices within the two resource blocks respectively in the two slots of a subframe to which the PUCCH is mapped are given by Table 4.

EXAMPLE FIVE

In the fifth example, ACK/NAK channels and CQI channels are carried by the resource block and the normal cyclic prefix is applied.
Here, $\Delta_{shift}^{PUCCH}=2$, N'=6 c=3 and thus n'(0) and n'(1)=f(n'(0)) are achieved as:

|                  |   |   |   |   | n'(0) |   |   |   |   |
|------------------|---|---|---|---|-------|---|---|---|---|
|                  | 0 | 1 | 2 | 3 | 4     | 5 | 6 | 7 | 8 |
| n'(1) = f(n'(0)) | 1 | 4 | 7 | 2 | 5     | 8 | 3 | 6 | 0 |

TABLE 4

Example of CS/OC Sequence Remapping, $\Delta_{shift}^{PUCCH} = 3$, Extended CP

| Cell specific cyclic shift offset | | slot 0 | | slot 1 | |
|---|---|---|---|---|---|
| $\delta_{offset} = 1$ | $\delta_{offset} = 0$ | $OC_{index} = 0$ | $OC_{index} = 2$ | $OC_{index} = 0$ | $OC_{index} = 2$ |
| $CS_{index} = 1$ | $CS_{index} = 0$ | n'(0) = 0 | | n'(1) = f(n'(0)) = 0 | |
| 2 | 1 | | n'(0) = 2 | | 1 |
| 3 | 2 | | | | |
| 4 | 3 | 1 | | 2 | |
| 5 | 4 | | 3 | | 3 |
| 6 | 5 | | | | |
| 7 | 6 | CQI | | CQI | |
| 8 | 7 | | | | |
| 9 | 8 | | | | |
| 10 | 9 | | | | |
| 11 | 10 | | | | |
| 0 | 11 | | | | |

Table 4 shows the example of CS/OC sequence remapping, where $\Delta_{shift}^{PUCCH}=3$ and an extended cyclic prefix is applied.

TABLE 5

Example of CS/OC Sequence Remapping, $\Delta_{shift}^{PUCCH} = 2$, Normal CP

| Cell specific cyclic shift offset | | slot 0 | | | slot 1 | | |
|---|---|---|---|---|---|---|---|
| $\delta_{offset} = 1$ | $\delta_{offset} = 0$ | $OC_{index} = 0$ | $OC_{index} = 1$ | $OC_{index} = 2$ | $OC_{index} = 0$ | $OC_{index} = 1$ | $OC_{index} = 2$ |
| $CS_{index} = 1$ | $CS_{index} = 0$ | n'(0) = 0 | | n'(0) = 6 | 8 | | 7 |
| 2 | 1 | | n'(0) = 3 | | | 6 | |
| 3 | 2 | 1 | | 7 | 0 | | 2 |
| 4 | 3 | | 4 | | | 1 | |
| 5 | 4 | 2 | | 8 | 3 | | 5 |
| 6 | 5 | | 5 | | | 4 | |
| 7 | 6 | | | | | | |
| 8 | 7 | | CQI | | | CQI | |
| 9 | 8 | | | | | | |
| 10 | 9 | | | | | | |
| 11 | 10 | | | | | | |
| 0 | 11 | | | | | | |

Table 5 shows the example of CS/OC sequence remapping, where $\Delta_{shift}^{PUCCH}=2$ and a normal cyclic prefix is applied. The resource indices within the two resource blocks respectively in the two slots of a subframe to which the PUCCH is mapped are given by Table 5.

EXAMPLE SIX

In the sixth example, ACK/NAK channels and CQI channels are carried by the resource block and the normal cyclic prefix is applied.

Here, $\Delta_{shift}^{PUCCH}=3$, N'=6, c=3, and thus n'(0) and n'(1)=f(n'(0)) are achieved as:

|  | n'(0) | | | | | |
|---|---|---|---|---|---|---|
|  | 0 | 1 | 2 | 3 | 4 | 5 |
| n'(1) = f (n'(0)) | 1 | 3 | 5 | 2 | 4 | 0 |

TABLE 6

Example of CS/OC Sequence Remapping, $\Delta_{shift}^{PUCCH} = 3$, Normal CP

| Cell specific cyclic shift offset | | RS orthogonal cover | | | ACK/NACK orthogonal cover | | |
|---|---|---|---|---|---|---|---|
| $\delta_{offset}=1$ | $\delta_{offset}=0$ | $OC_{index}=0$ | $OC_{index}=1$ | $OC_{index}=2$ | $OC_{index}=0$ | $OC_{index}=1$ | $OC_{index}=2$ |
| $CS_{index}=1$ | $CS_{index}=0$ | n'(0) = 0 | | | 5 | | |
| 2 | 1 | | n'(0) = 2 | | | 3 | |
| 3 | 2 | | | n'(0) = 4 | | | 4 |
| 4 | 3 | 1 | | | 0 | | |
| 5 | 4 | | 3 | | | 1 | |
| 6 | 5 | | | 5 | | | 2 |
| 7 | 6 | | | | | | |
| 8 | 7 | | CQI | | | CQI | |
| 9 | 8 | | | | | | |
| 10 | 9 | | | | | | |
| 11 | 10 | | | | | | |
| 0 | 11 | | | | | | |

Table 6 shows the example of CS/OC sequence remapping, where $\Delta_{shift}^{PUCCH}=3$ and a normal cyclic prefix is applied. The resource indices within the two resource blocks respectively in the two slots of a subframe to which the PUCCH is mapped are given by Table 6.

Examples of Method D

Two examples (Examples seven and eight) for illustrating method D are listed below. As shown in these examples, the proposed method D may be generally adapted to a complex 3GPP LTE physical uplink where ACK/NAK resource blocks may be applied by the extended cyclic prefix, mixed resource blocks (where the ACK/NAK and CQI channels coexist) may be applied by the normal cyclic prefix, or mixed resource blocks (where the ACK/NAK and CQI channels coexist) may be applied by the extended cyclic prefix. Examples of Method D are on the assumption that normal CP are used and normal CP parameter $d_3=1$.

EXAMPLE SEVEN

In the seventh example, ACK/NAK channels and CQI channels are carried by the resource block and the normal cyclic prefix is applied.

Here, $\Delta_{shift}^{PUCCH}=2$, N'=6, c=3, and thus n'(0) and n'(1)=f(n'(0)) are achieved as:

|  | n'(0) | | | | | | | | |
|---|---|---|---|---|---|---|---|---|---|
|  | 0 | 1 | 2 | 3 | 4 | 5 | 6 | 7 | 8 |
| n'(1) = f (n'(0)) | 3 | 6 | 1 | 4 | 7 | 2 | 5 | 8 | 0 |

TABLE 7

Example of CS/OC Sequence Remapping, $\Delta_{shift}^{PUCCH} = 2$, Normal CP

| Cell specific cyclic shift offset | | slot 0 | | | slot 1 | | |
|---|---|---|---|---|---|---|---|
| $\delta_{offset}=1$ | $\delta_{offset}=0$ | $OC_{index}=0$ | $OC_{index}=1$ | $OC_{index}=2$ | $OC_{index}=0$ | $OC_{index}=1$ | $OC_{index}=2$ |
| $CS_{index}=1$ | $CS_{index}=0$ | n'(0) = 0 | | n'(0) = 6 | 8 | | 1 |
| 2 | 1 | | n'(0) = 3 | | | 0 | |
| 3 | 2 | 1 | | 7 | 2 | | 4 |
| 4 | 3 | | 4 | | | 3 | |
| 5 | 4 | 2 | | 8 | 5 | | 7 |
| 6 | 5 | | 5 | | | 6 | |
| 7 | 6 | | | | | | |
| 8 | 7 | | CQI | | | CQI | |
| 9 | 8 | | | | | | |
| 10 | 9 | | | | | | |
| 11 | 10 | | | | | | |
| 0 | 11 | | | | | | |

Table 7 shows the example of CS/OC sequence remapping, where $\Delta_{shift}^{PUCCH}=2$ and a normal cyclic prefix is applied. The resource indices within the two resource blocks respectively in the two slots of a subframe to which the PUCCH is mapped are given by Table 7.

EXAMPLE EIGHT

In the eighth example, ACK/NAK channels and CQI channels are carried by the resource block and the normal cyclic prefix is applied.
Here, $\Delta_{shift}^{PUCCH}=3$, N'=6 c=3, and thus n'(0) and n'(1)=f(n'(0)) are achieved as:

| | n'(0) | | | | | |
|---|---|---|---|---|---|---|
| | 0 | 1 | 2 | 3 | 4 | 5 |
| n'(1) = f (n'(0)) | 2 | 4 | 1 | 3 | 5 | 0 |

TABLE 8

Example of CS/OC Sequence Remapping, $\Delta_{shift}^{PUCCH}=3$, Normal CP

| Cell specific cyclic shift offset | | RS orthogonal cover | | | ACK/NACK orthogonal cover | | |
|---|---|---|---|---|---|---|---|
| $\delta_{offset}=1$ | $\delta_{offset}=0$ | $OC_{index}=0$ | $OC_{index}=1$ | $OC_{index}=2$ | $OC_{index}=0$ | $OC_{index}=1$ | $OC_{index}=2$ |
| $CS_{index}=1$ | $CS_{index}=0$ | n'(0) = 0 | | | 5 | | |
| 2 | 1 | | n'(0) = 2 | | | 0 | |
| 3 | 2 | | | n'(0) = 4 | | | 1 |
| 4 | 3 | 1 | | | 2 | | |
| 5 | 4 | | 3 | | | 3 | |
| 6 | 5 | | | 5 | | | 4 |
| 7 | 6 | | | | | | |
| 8 | 7 | | CQI | | | CQI | |
| 9 | 8 | | | | | | |
| 10 | 9 | | | | | | |
| 11 | 10 | | | | | | |
| 0 | 11 | | | | | | |

Table 8 shows the example of CS/OC sequence remapping, where $\Delta_{shift}^{PUCCH}=3$ and a normal cyclic prefix is applied. The resource indices within the two resource blocks respectively in the two slots of a subframe to which the PUCCH is mapped are given by Table 8.

The foregoing paragraphs describe the details of methods and apparatus that are especially adept at remapping the physical uplink control channels.

What is claimed is:

1. A method for transmitting physical uplink channel signals, the method comprising the steps of:
   identifying a cyclic shift and an orthogonal cover for physical uplink control channel information;
   applying the identified cyclic shift and the orthogonal cover to the physical uplink control channel information;
   mapping the physical uplink control channel information applied to the identified cyclic shift and orthogonal cover into two resource blocks respectively located at two slots of a subframe; and
   transmitting the uplink control channel information applied to the identified cyclic shift and orthogonal cover and mapped to the two resource blocks,
   wherein a position where one of the two resource blocks is located in a second slot is different compared to a position where the other of the two resource blocks is located in a first slot,
   wherein, when $n_s$ mod 2=1, resources of the physical uplink control channel within the second slot of the two slots of the subframe are established based on:

$$n'(n_s) = \begin{cases} \text{if } n^{(1)}_{PUCCH} \geq c \cdot \frac{N^{(1)}_{cs}}{\Delta^{PUCCH}_{shift}} \\ [c(n'(n_s-1)+1)] \bmod \left( \frac{cN^{RB}_{sc}}{\Delta^{PUCCH}_{shift}}+1 \right)-1 \\ \text{otherwise,} \\ \left\lfloor \frac{h}{c} \right\rfloor + (h \bmod c) \cdot \frac{N'}{\Delta^{PUCCH}_{shift}} \end{cases}$$

where:
$$h = (n'(n_s-1)+d) \bmod (cN'/\Delta^{PUCCH}_{shift})$$

where $n_s$ is an index of a slot, $n^{(1)}_{PUCCH}$ is a resource index for the physical uplink control channel, $N^{(1)}_{CS}$ is the number of cyclic shifts used for the physical uplink control channel in the resource blocks, $N^{RB}_{sc}$ is the size of the resource block in the frequency domain, d is a predetermined parameter, $\Delta^{PUCCH}_{shift}$ is a parameter signaled by a higher layer, and $$c = \begin{cases} 3 \text{ for normal cyclic prefix} \\ 2 \text{ for extended cyclic prefix} \end{cases}.$$

2. The method of claim 1, wherein, when $n_s$ mod 2=0, resources of the physical uplink control channel within the first slot of the two slots of the subframe are established based on:

$$n'(n_s) = \begin{cases} \text{if } n^{(1)}_{PUCCH} < c \cdot \frac{N^{(1)}_{cs}}{\Delta^{PUCCH}_{shift}}, \\ n^{(1)}_{PUCCH} \\ \text{otherwise,} \\ \left( n^{(1)}_{PUCCH} - c \cdot \frac{N^{(1)}_{cs}}{\Delta^{PUCCH}_{shift}} \right) \bmod \left( c \cdot \frac{N^{RB}_{sc}}{\Delta^{PUCCH}_{shift}} \right) \end{cases},$$

where $n_s$ is an index of a slot, $n^{(1)}_{PUCCH}$ is the resource index for the physical uplink control channel, $N^{(1)}_{CS}$ is the number of cyclic shifts used for the physical uplink control channel in the resource blocks, $N_{sc}^{RB}$ is the size of the resource block in the frequency domain, $\Delta_{shift}^{PUCCH}$ is a parameter signaled by a higher layer, and $$c = \begin{cases} 3 & \text{for the normal cyclic prefix} \\ 2 & \text{for the extended cyclic prefix} \end{cases}.$$

3. The method of claim 1 wherein d=2 for the normal cyclic prefix and d=0 for the extended cyclic prefix.

4. The method of claim 1, wherein the physical uplink control channel information comprises at least one of an acknowledgement and a non-acknowledgement.

5. The method of claim 1, wherein the physical uplink control channel information comprises a channel quality indication.

6. The method of claim 1, wherein the physical uplink control channel information comprises a channel quality indication and at least one of an acknowledgement and a non-acknowledgement.

7. The method of claim 1, wherein the physical uplink control channel information is transmitted in an OFDM (Orthogonal Frequency Division Multiplexing) resource block.

8. The method of claim 1, wherein the resources of the physical uplink control channel within the second slot of the two slots of the subframe comprise the cyclic shift and the orthogonal cover.

9. The method of claim 1, wherein the cyclic shift and the orthogonal cover are individually determined by the function of $n'(n_s)$ corresponding to each of the cyclic shift and the orthogonal cover.

10. An apparatus for transmitting physical uplink channel signals, the apparatus comprising:
   a signal processor configured to
      identify a cyclic shift and an orthogonal cover for physical uplink control channel information;
      apply the identified cyclic shift and the orthogonal cover to the physical uplink control channel information;
      map the physical uplink control channel information applied to the identified cyclic shift and orthogonal cover into resource blocks respectively located at two slots of a subframe; and
   a transmitting antenna unit configured to transmit the uplink control channel information applied to the identified cyclic shift and orthogonal cover and mapped to the two resource blocks,
   wherein a position where one of the resource blocks is located in a second slot is different compared to a position where another of the resource blocks is located in a first slot,
   wherein, when $n_s \bmod 2 = 1$, resources of the physical uplink control channel within the second slot of the two slots of the subframe are established based on:

$$n'(n_s) = \begin{cases} \text{if } n_{PUCCH}^{(1)} \geq c \cdot N_{cs}^{(1)} / \Delta_{shift}^{PUCCH} \\ [c(n'(n_s-1)+1)] \bmod \left( cN_{sc}^{RB} / \Delta_{shift}^{PUCCH} + 1 \right) - 1 \\ \text{otherwise,} \\ [h/c] + (h \bmod c) \cdot N'/\Delta_{shift}^{PUCCH} \end{cases}$$

where:
$$h = (n'(n_s-1) + d) \bmod \left( cN' / \Delta_{shift}^{PUCCH} \right)$$

where $n_s$ is an index of a slot, $n_{PUCCH}^{(1)}$ is a resource index for the physical uplink control channel, $N_{CS}^{(1)}$ is the number of cyclic shifts used for the physical uplink control channel in the resource blocks, $N_{sc}^{RB}$ is the size of the resource block in the frequency domain, d is a predetermined parameter, $\Delta_{shift}^{PUCCH}$ is a parameter signaled by a higher layer, and $$c = \begin{cases} 3 & \text{for normal cyclic prefix} \\ 2 & \text{for extended cyclic prefix} \end{cases}.$$

11. The apparatus of claim 10, wherein, when $n_s \bmod 2 = 0$, resources of the physical uplink control channel within the first slot of the two slots of the subframe are established based on:

$$n'(n_s) = \begin{cases} \text{if } n_{PUCCH}^{(1)} < c \cdot \frac{N_{cs}^{(1)}}{\Delta_{shift}^{PUCCH}}, \\ n_{PUCCH}^{(1)} \\ \text{otherwise,} \\ \left( n_{PUCCH}^{(1)} - c \cdot \frac{N_{cs}^{(1)}}{\Delta_{shift}^{PUCCH}} \right) \bmod \left( c \cdot \frac{N_{sc}^{RB}}{\Delta_{shift}^{PUCCH}} \right) \end{cases},$$

where $n_s$ is an index of a slot, $n_{PUCCH}^{(1)}$ is the resource index for the physical uplink control channel, $N_{cs}^{(1)}$ is the number of cyclic shifts used for the physical uplink control channel in the resource blocks, $N_{sc}^{RB}$ is the size of the resource blocks in the frequency domain, $\Delta_{shift}^{PUCCH}$ is a parameter signaled by a higher layer, and $$c = \begin{cases} 3 & \text{for the normal cyclic prefix} \\ 2 & \text{for the extended cyclic prefix} \end{cases}.$$

12. The apparatus of claim 10, wherein d=2 for the normal cyclic prefix and d=0 for the extended cyclic prefix.

13. The apparatus of claim 10, wherein the physical uplink control channel information comprises at least one of an acknowledgement and a non-acknowledgement.

14. The apparatus of claim 10, wherein the physical uplink control channel information comprises a channel quality indication.

15. The apparatus of claim 10, wherein the physical uplink control channel information comprises a channel quality indication and at least one of an acknowledgement and a non-acknowledgement.

16. The apparatus of claim 10, wherein the physical uplink control channel information is transmitted in an OFDM (Orthogonal Frequency Division Multiplexing) resource block.

17. The mobile communication device of claim 10, wherein the resources of the physical uplink control channel within the second slot of the two slots of the subframe comprise the cyclic shift and the orthogonal cover.

18. The mobile communication device of claim 10, wherein the cyclic shift and the orthogonal cover are individually determined by the function of $n'(n_s)$ corresponding to each of the cyclic shift and the orthogonal cover.

19. A mobile communication device configured to transmit physical uplink channel signals, the mobile communication device comprising:
   a receiver unit; and
   a transmitter unit comprising a signal processor and a transmitting antenna unit, the signal processor configured to identify a cyclic shift and an orthogonal cover for physical uplink control channel information;
apply the identified cyclic shift and the orthogonal cover to the physical uplink control channel information;
map the physical uplink control channel information applied to the identified cyclic shift and orthogonal cover into resource blocks respectively located at two slots of a subframe;
wherein a position where one of the resource blocks is located in a second slot is different compared to a position where another of the resource blocks is located in a first slot,
wherein, when $n_s$ mod 2=1, resources of the physical uplink control channel within the second slot of the two slots of the subframe are established based on:
where $n_s$ is an index of a slot, $n_{PUCCH}^{(1)}$ is a resource index for the physical uplink control channel, $N_{CS}^{(1)}$ is the number of cyclic shifts used for the physical uplink control channel in the resource blocks, $N_{sc}^{RB}$ is the size of the resource block in the frequency domain, d is a predetermined parameter, $\Delta_{shift}^{PUCCH}$ is a parameter signaled by a higher shift layer, and $$c = \begin{cases} 3 \text{ for normal cyclic prefix} \\ 2 \text{ for extended cyclic prefix} \end{cases}.$$

20. The mobile communication device of claim 19, wherein, when $n_s$ mod 2=0, resources of the physical uplink control channel within the first slot of the two slots of the subframe are established based on:

$$'(n_s) = \begin{cases} \text{if } n_{PUCCH}^{(1)} < c \cdot \frac{N_{cs}^{(1)}}{\Delta_{shift}^{PUCCH}}, \\ n_{PUCCH}^{(1)} \\ \text{otherwise,} \\ \left(n_{PUCCH}^{(1)} - c \cdot \frac{N_{cs}^{(1)}}{\Delta_{shift}^{PUCCH}}\right) \mod \left(c \cdot \frac{N_{sc}^{RB}}{\Delta_{shift}^{PUCCH}}\right) \end{cases},$$

where $n_s$ is an index of a slot, $n_{PUCCH}^{(1)}$ is the resource index for the physical uplink control channel, $N_{cs}^{(1)}$ is the number of cyclic shifts used for the physical uplink control channel in the resource blocks, $N_{sc}^{RB}$ is the size of the resource blocks in the frequency domain, $\Delta_{shift}^{PUCCH}$ is a parameter signaled by a higher layer, and $$c = \begin{cases} 3 \text{ for normal cyclic prefix} \\ 2 \text{ for extended cyclic prefix} \end{cases}.$$

21. The mobile communication device of claim 19, wherein d=2 for the normal cyclic prefix and d=0 for the extended cyclic prefix.

22. The mobile communication device of claim 19, wherein the physical uplink control channel information comprises at least one of an acknowledgement and a non-acknowledgement.

23. The mobile communication device of claim 19, wherein the physical uplink control channel information comprises a channel quality indication.

24. The mobile communication device of claim 19, wherein the physical uplink control channel information comprises a channel quality indication and at least one of an acknowledgement and a non-acknowledgement.

25. The mobile communication device of claim 19, wherein the physical uplink control channel information is transmitted in an OFDM (Orthogonal Frequency Division Multiplexing) resource block.

26. The mobile communication device of claim 19, wherein the resources of the physical uplink control channel within the second slot of the two slots of the subframe comprise the cyclic shift and the orthogonal cover.

27. The mobile communication device of claim 19, wherein the cyclic shift and the orthogonal cover are individually determined by the function of $n'(n_s)$ corresponding to each of the cyclic shift and the orthogonal cover.

* * * * *

UNITED STATES PATENT AND TRADEMARK OFFICE
CERTIFICATE OF CORRECTION

PATENT NO. : 8,160,018 B2
APPLICATION NO. : 12/289978
DATED : April 17, 2012
INVENTOR(S) : Jianzhong Zhang et al.

Page 1 of 2

It is certified that error appears in the above-identified patent and that said Letters Patent is hereby corrected as shown below:

Please correct Column 26, Line 61 - Column 27 Line 25, Claim 19 to read as follows:

Claim 19

A mobile communication device configured to transmit physical uplink channel signals, the mobile communication device comprising:
 a receiver unit; and
 a transmitter unit comprising a signal processor and a transmitting antenna unit, the signal processor configured to
  identify a cyclic shift and an orthogonal cover for physical uplink control channel information;
  apply the identified cyclic shift and the orthogonal cover to the physical uplink control channel information;
  map the physical uplink control channel information applied to the identified cyclic shift and orthogonal cover into resource blocks respectively located at two slots of a subframe;
  wherein a position where one of the resource blocks is located in a second slot is different compared to a position where another of the resource blocks is located in a first slot,
  wherein, when ns mod2=1, resources of the physical uplink control channel within the second slot of the two slots of the subframe are established based on:

Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 8,160,018 B2

Continuation of Claim 19.

$$n'(n_s) = \begin{cases} \text{if } n_{PUCCH}^{(1)} \geq c \cdot N_{cs}^{(1)}/\Delta_{shift}^{PUCCH} \\ \left[c(n'(n_s-1)+1)\right] \bmod(cN_{sc}^{RB}/\Delta_{shift}^{PUCCH}+1)-1 \\ otherwise, \\ \lfloor h/c \rfloor + (h \bmod c) \cdot N'/\Delta_{shift}^{PUCCH} \end{cases}$$

where:

$$h = (n'(n_s-1)+d) \bmod(cN'/\Delta_{shift}^{PUCCH})$$

where $n_s$ is an index of a slot, $n_{PUCCH}^{(1)}$ is a resource index for the physical uplink control channel, $N_{CS}^{(1)}$ is the number of cyclic shifts used for the physical uplink control channel in the resource blocks, $N_{sc}^{RB}$ is the size of the resource block in the frequency domain, d is a predetermined parameter, $\Delta_{shift}^{PUCCH}$ is a parameter signaled by a higher layer, and $$c = \begin{cases} 3 & \text{for normal cyclic prefix} \\ 2 & \text{for extended cyclic prefix} \end{cases}$$